INVENTOR.
SILVIO REPETTO

Jan. 5, 1971 S. REPETTO 3,552,157
MACHINE FOR THE CONTINUOUS PROCESSING OF SKINS
Filed Jan. 24, 1969 2 Sheets-Sheet 2
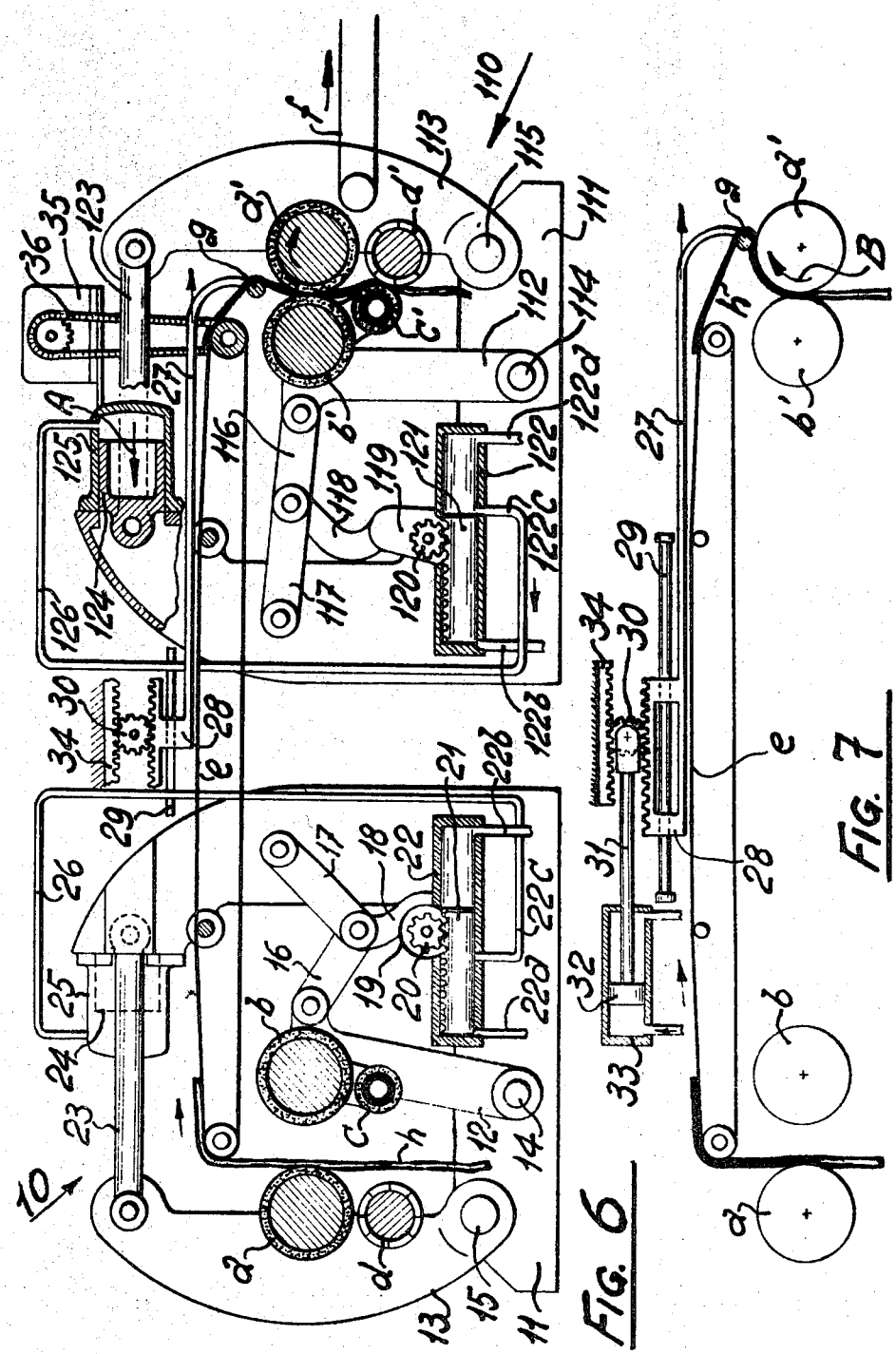
INVENTOR.
SILVIO REPETTO
BY *Hofgren, Wegner,*
*Allen, Stellman*
*& McCord*

United States Patent Office 3,552,157
Patented Jan. 5, 1971

3,552,157
MACHINE FOR THE CONTINUOUS
PROCESSING OF SKINS
Silvio Repetto, Modena, Italy, assignor to S.p.A.
Luigi Rizzi & Co., an Italian company
Filed Jan. 24, 1969, Ser. No. 800,800
Claims priority, application Italy, Jan. 27, 1968,
12,100/68; Nov. 13, 1968, 23,681/68
Int. Cl. C14b 1/06
U.S. Cl. 69—42                                     8 Claims

ABSTRACT OF THE DISCLOSURE

A machine for processing sheet materials such as leather or skins including a plurality of cylinders defining a manually fed unit and a plurality of cylinders defining an automatically controlled unit. The apparatus includes at least one controlled conveyor belt or cylinder for transferring the piece being processed. The cylinder units effect selective preparation and processing of the pieces being processed.

---

Figure 1:
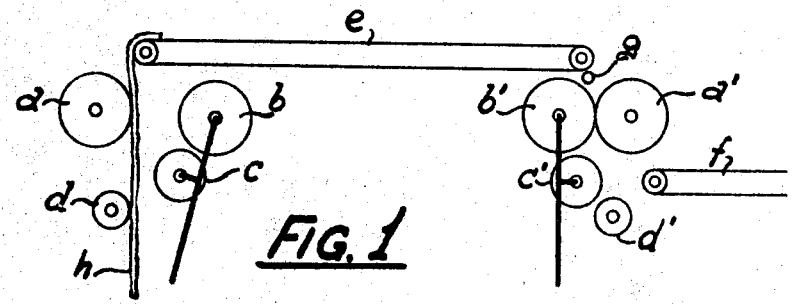

The present invention concerns a machine for the processing of leather or skins, said machine being provided with a plurality of cylinders for the conveyance, preparation and processing of the material.

In particular, the present invention concerns a machine which has one or more supporting and conveying cylinders on which the material is placed that has to be processed. Said cylinders may be provided with a feed for bringing the material to the preparation and processing cylinders. The drives of this machine may be either by hydraulic, electrical or mechanical.

In conventional machines the operator is obliged to perform each operation of insertion and extraction at least twice for each skin, since, in the processing thereof, there are preferred directions in which the tools have to act (for example from the line of the back towards the sides or from the centre to the head or towards the rear portion).

This involves a low yield from the machine on account of stoppages due to the turning and second insertion of the skin, and a low performance on the part of the operator, because of the double manipulation required for each skin.

To surmount the disadvantages of such conventional machines executing only a single operating process, continuously operating machines have been provided in which the skins to be processed are inserted by hand at one side, to be half-processed, and are then passed into the other side of the machine in which the half-process already effected in the first treatment of the skin by said first passage is completed.

A conventional type of machine for a special continous process of skins by means of squeezing or compression cylinders or the like. involves coupling together two single-operation machines, disposed one behind the other, in the same relative position and connected together by means of a conveyor belt. A similar machine as described in U.S. Pat. No. 3,349,583 has the squeezing cylinders disposed one above the other, the lower ones of which oscillate to produce the opening and closure between one cylinder and the other, and the upper rollers are vertically displaceable to produce the pressure against the lower cylinders.

In this unit the skin is half introduced into the first machine, issues therefrom partially processed and falls reversed onto a conveyor belt, enters the second machine which, meanwhile, has been opened by means of a push button, is processed and reversed again by the direction of rotation of the cylinders, and is then discharged by means of a final conveyor belt.

This conventional assembly has many disadvantages which not only appreciably reduce the speed of processing and hence nullify to a certain extent the substantial advantage of continuous operation, but also cause incorrect processing of the skin itself. In fact, it is necessary, with the said conventional type, to rotate at least one of the machines twice for each skin, first in one direction and then in the opposite direction.

Again, in the transfer from one machine to the other by means of the conveyor, the skin is reversed and in this condition presents itself to the second machine in which the cylinders, that, in the first machine, are in contact with one side of the skin (the surface) are then in contact with the other side of the same skin, (the flesh side) leaving on the surface thereof and then only on a half of the entire skin, any impressions or signs of one of the two operations. If this latter disadvantage can also be accepted in the case of operations on the skin in which symmetrical processing rollers are used, such as compression rollers and the like, it would, on the contrary, make it impossible to apply the same arrangement of the parts of the said conventional machine to other machines which perform various operations in which processing rollers work on only one side of the skin, or are asymmetrical, such as for example, for the process known as "retention" (flattening or levelling and stretching of the outer surface of the skin), depilation, de-fleshing, shaving and the like in which suitable devices perform an operation on only one specific side of the skin.

Other types of conventional machines for continuous processing have the operating rollers in a horizontal position and conveyors arranged in such manner that the skin is always processed on the same side; however, the skin has to perform a double return movement through the two machines, and the conveyor rollers which are provided for the displacement of the skin, are obliged to change the direction of rotation four times for each cycle and each skin, and they are obliged to open and close the same number of times, resulting in a considerable loss of time and great complication in the control and actuating devices.

The object of the present invention is to avoid the aforementioned disadvantages by providing a machine which, whilst adopting the most suitable working cycle to obtain a correct result, has the maximum yield possible both in respect to a machine as such, and to the labour involved. For this purpose the present invention provides a machine for the processing of sheet-like materials, such as leather and skins, comprising an initial operating unit formed of assemblies of cylinders and/or devices suitable for performing a specific operation on the skin, and a second operating unit, similar to the foregoing, also provided with assemblies of cylinders and/or devices suitable for performing the same opeartion on the skin issuing from the foregoing assembly, the feed of the second assembly being effected automatically and continuously, by taking up, conveying and inserting the partly processed skin from the first unit into the said second unit without said second unit having to reverse or modify its own cycle of operation, the operation effected by the first unit being completed by the said second operation, whilst the skin issuing from the second operating unit is conveyed by means of a reversing device and by means of the same operating members of the second unit, on to a conveyor belt for the discharge of the finished skin.

The last conveyor may have any one of three purposes:

(a) To convey the skin to a stacking device,
(b) To convey the skin to a new operating cycle,
(c) To bring the skin to the end of the machine where the same operator collects it on a tressel.

In addition, according to the present invention, means are provided for the opening and closing of each operating unit, means for the control of the reversing device and means for producing the pressure between the working cylinders and the counter-cylinders.

More particularly, according to the invention, the operating units are formed of two single operation machines each comprising a base and two hydraulically controlled levers, one of which carries the operating cylinders and the other the counter-cylinders, whilst a conveyor belt, continuously driven in the same direction, conveys the skin from one operating unit to the other. Due to the arrangement of the two machines, both the counter-cylinders of each unit are opposed by the counter-cylinders of the other unit and are disposed within the two units, whilst the operating cylinders of each machine are on the outside thereof and therefore they also are opposed to each other. Such an arrangement, is however, tied to the type of process, and therefore the arrangement of the working cylinders and the counter-cylinders may be reversed, and each of the said levers may carry an operating cylinder and a counter-cylinder.

The control of the hydraulic pressure and counter-pressure units is synchronised for each assembly with that of the other assembly, whilst the control of the reversing device, also hydraulic, depends on the control of the second operating assembly.

The arrangement of the conveyor belt makes it possible to engage the various operating assemblies only for the effective time of intake and discharge of a skin which is processed in each; consequently 100% use is made both of the machine and the labour employed.

The machine of the present invention completely avoids all the disadvantages of conventional types and also makes it possible to execute continuously any processing operation of the skins, whether with operating cylinders, cylindrical devices or whether with devices, knives or cutters of various types, rotating or stationary.

These and other features will be apparent from the following detailed description referring to the accompanying drawings, of a machine for the continuous processing of skins, illustrated schematically and, in general, formed of two operating units, as also of a machine adapted to compress the skins, acting on one half each time, but always on the same side.

In the drawings:

FIGS. 1–5 show schematically the arrangement of the two operating units and the various phases of operation on the skins, FIG. 6 shows the machine for the compression of the skins as a side view and, FIG. 7 shows in detail and enlarged, the device for reversing the skin shown in FIG. 6.

With reference to FIGS. 1–5 the references: $a, b, a', b'$ represent the compression, or feed, cylinders; $c, c'$ represent the operating or counter-pressure, or backing, cylinders; $d, d'$ represent the counter-pressure or operating, or tool, cylinders; $e$ represents the conveyor forming a connection between the two assemblies; $f$ represents the discharge conveyor of the second assembly; $g$ represents the reversing device; and $h$ represents the material to be processed. The portions of the material under process $h$ indicated by a full straight line have already been processed whilst the parts shown by an uneven line have still to be processed.

The operating assemblies may be provided with a greater or lesser number of cylinders, according to the operation it is desired to perform on the skin.

The operating cylinders of the two units are provided with means for rotations, and relative movement to or from each other.

With regard to the first unit, the control of the movements is effected by the operator.

The second operating unit reproduces at the appropriate moment the movements of the first unit through the control of a memory (storer), which may be electronic, electromechanical or mechanical, synchronised with the feeding speed of the material.

The belts $e$ and $f$ are provided with a continuous translatory movement synchronised with the working speed of the two operating units.

Figure 2:
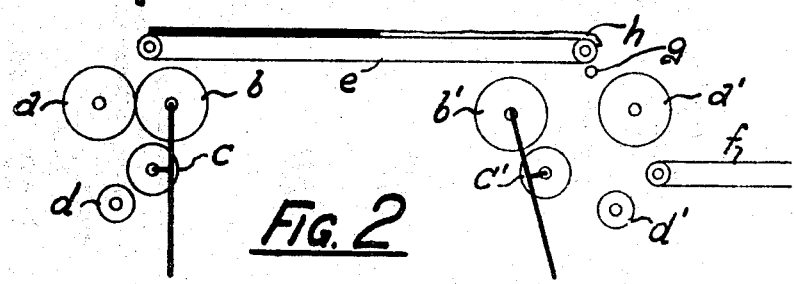

FIG. 1, shows the machine at the beginning of the working cycle. The operator has inserted the skin in the first operating unit, placing the end of the unprocessed portion in this phase on the conveyor belt $e$, thus starting the work by operating the closure of the cylinders $b$ and $c$ (FIG. 2).

At this point the following should be noted:

The distance between the working lines of the two working units;

The distance between the unprocessed end of the skin and the intake of the second operating unit;

The travelling speed of the skin.

Figure 3:
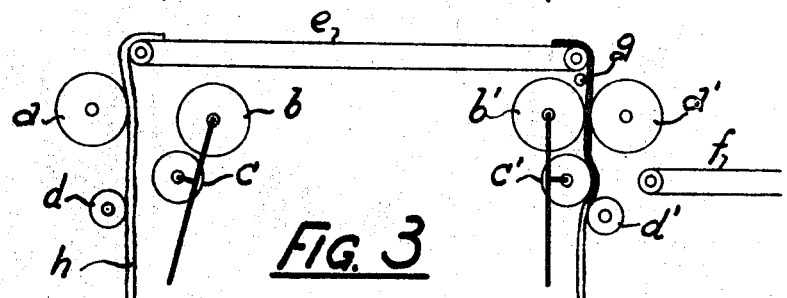

It is therefore possible to open the cylinders $b'$ and $c'$ of the second unit by a control on the arrival of the skin (FIG. 2) and to close them when the entire skin, not processed by the first unit, has passed over the working line of the second (FIG. 3).

Figure 4:
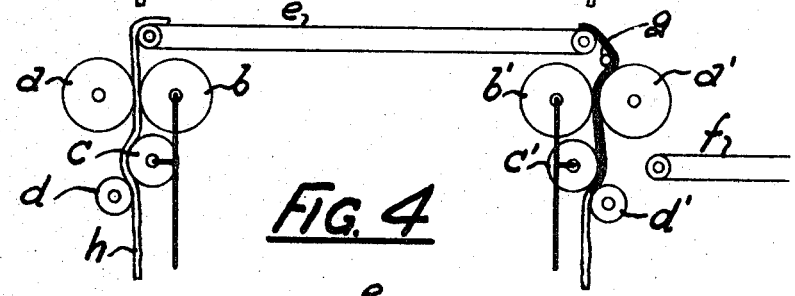
Figure 5:
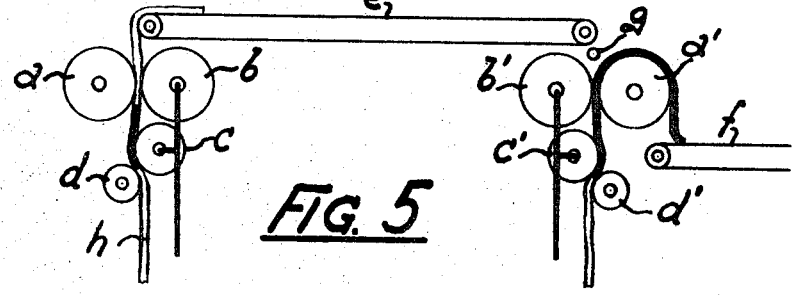

At this point the second half of the skin is processed by the second operating unit and the device $g$ which reverses the skins on the cylinder $a'$, comes into operation, which cylinder, during the following operation, reverses it onto the conveyor $f$ which carries away the skin completely processed by the second operating unit (FIGS. 4 and 5). Said reversing device comprises a loose roller driven with a horizontal translatory motion, located above the cylinder $a'$, as will be explained in greater detail hereinafter. At the same time the operator introduces a second skin into the first operating unit.

With reference to FIG. 6, the two operating units are shown as two machines 10 and 110, identical to each other disposed one behind the other in the direction of travel of the skin and the second 110 of which is reversed relatively to the first machine 10, so that the cylinders $b, c, b', c'$, are within the unit and the cylinders $a, d, a', d'$ are external thereof.

A conveyor belt $e$ connects the two machines horizontally, whilst a conveyor belt $f$ removes the processed skins behind the second machine 110.

Each operating unit is formed as a separate machine, and in the embodiment shown they are rotary presses adapted to dry the skin, causing it to pass between the two cylinders $a, b, (a', b')$ tightly pressed together and provided with felt so as to squeeze out the liquid contained in the skin, whilst the cylinder $d$ ($d'$) called "ironing," in opposition to the roller $c$ ($c'$) enlarges and stretches the skin, eliminating any crease, convexities or the like thereon. The said arrangements of the rollers does not vary substantially with the variation of the processes, but the functions of the rollers change and, hence, the type and nature thereof. For example, in the case of the de-fleshing process, the "ironing" cylinder is replaced by a "knife" cylinder; in the case of the "retention" process, the "ironing" cylinder is disposed between a support roller and a stretching roller in order to enclose the skin over a greater arc, and so on.

The unit 10 (or 110) comprises an L-shaped base 11 (111) on the lower part of which there are pivoted two large levers 12 and 13 (112–113) on fixed pivots 14 and 15 (114–115). The lever 12 (112) supports the counter-rollers $b, c, (b', c')$ and is actuated from a remote position to a close position relatively to the opposed lever 13 (113) by a system of toggle levers 16, 17, 18 (116–

117–118) controlled by a knob 19 (119) connected to a gear 20 (120) connected to the rack 21 (121) attached to the piston sliding in the hydraulically controlled cylinder 22 (122).

In the machine 10, the unit 16, 17, 18, 19, 20, 21 is disposed so that the rollers b, c, are in the remote position from the opposed rollers a, d and in the machine 110, the same unit from 116 to 121 is in the opposite position, that is with the rods 116, 117 in alignment so as to bring the counter-rollers close to the pressure rollers and keep them in the working position.

The lever 13 (113) pivoted at 15 (115) is connected at its upper end, by way of tie rods 23 (123), to a displaceable piston 24 (124) within the cylinder 25 (125) connected to the base frame and hydraulically controlled by a connection 26 (126) with the cylinder 22 (122) associated with the said lever 12 (112).

The lever 13 carries a pressure roller a (a') and with part d (d') is for the purpose of effecting a second movement of the connecting rod A of piston 24, as allowed by the rollers b, c, (b'–c') when these are aligned with rods 16, 17 (116–117) as shown at 110.

The said reversing device, which terminates in a displacement roller g, is formed (see in detail FIG. 7) by said roller g supported by arms 27 connected to a slide 28 moving on guides 29 controlled by the pinion 30 axially displaced by the shaft 31 of a piston 32 sliding in the cylinder 33.

In order to have a path of double length relative to the movement of the piston 32, the pinion 30 also engages in a fixed rack 34, connected to the base.

The conveyor belt e is controlled by a reduction gear 35 and a chain 36. With reference to the machine 10, the cylinder 22 is fed by a source of pressurised fluid (not shown) and comprises the terminal inlets 22a, 22b and intermediate inlet 22c, the latter being connected by the tube 26 to the cylinder 25 (or 122a, 122b, 122c, 126 and 125 for the machine 110).

The operation is as follows: at the beginning of a cycle, the machine is as shown in FIGS. 1 and 6, namely, with the unit 10 on the left open, into which the operator inserts the skin h to be half-processed, resting the upper end on the conveyor belt e.

The feeding fluid under pressure into the cylinder 22 from the opening 22a, the piston with rack 21 is displaced to the right, rotating the knob 19 upward whereby the rods 16, 17 are in alignment under the thrust of the rod 18 and hence the lever 12 is in the stable rear position. When the piston 21 arrives to uncover the opening 22c, the pressurised fluid flows from the cylinder 22 to the upper cylinder 25, urges the piston 24 to the right and, consequently, by means of the tie rods 23, urges the lever 13 against the lever 12. In this manner the rollers a, d press on the skin h against the rollers b, c.

The skin h is urged upward and continues with the conveyor belt e as far as the unit 110 which is open, as shown in FIG. 2. The skin drops between the cylinders a', b', c', d', by the unprocessed half and without being reversed relative to the preceding position, until, as a result of an automatic control based on the speed of translation of the conveyor belt or as a result of the operation of a push button, photo-electric cell or like conventional device, fluid is fed under pressure to the cylinder 122 from the opening 122a as already stated in the preceding case to operate the displacement of the rollers b', c' towards the couple a', d' of the lever 113 and to generate the pressure of the latter against the first by way of the cylinder 125 and piston 124. As soon as the rollers are pressed against each other, the reversing device comes into operation with the supply of fluid from the left side of the cylinder 33 and consequently, displacement of the pinion 30. The latter, by rotating between the fixed rack 34 and the displaceable rack 28 urges said rack 28 to the right, which in turn, sliding on the guides 29 and by way of the arms 27, displaces the roller g to the right from an inoperative position below the end of the conveyor belt e to a position remote from the same end. The skin h is, however, deflected from the conveyor belt e to the pressure roller a' which, by rotating in the direction of the arrow B drops the skin on the discharge conveyor f.

As may be observed, the skin h, having its second half processed by the unit 110, has not been reversed relative to the position it had in the first processing relatively to the devices and/or operating rollers, whereby the side required may be taken into consideration and this is particularly important when the processing involves an action effected on a specific side of the skin, such as de-hairing, de-fleshing, ironing and the like. In addition, the two units 10 and 110 may be driven continuously in rotation always in the same direction, without the necessity to reverse or stop and, finally, by adapting the length of the conveyor belt to that of the skin and the speed of movement, it is possible to obtain continuous use of both the machines without stoppages or idling.

In particular, in this case it is also possible, when one operating unit is closed, for the other to be open and both to be in the same phase, whereby the hydraulic cylinders controlling the closing and those controlling pressure may be the same for both the units and this may apply to the base and the other common constructions.

The following advantages result from the above description:

(1) The process is in fact "continuous" for all purposes: the skin is processed on 100% of its surface and the operator performs the single operation of insertion and does this only once for each skin.
(2) The skin is subjected to a conventional process which takes into account the methods required by accurate processing.
(3) The operator is able to open the first operating unit and begin the loading operation of the next skin as soon as the preceding skin has left the operating zone of the said unit.

Between the loading operations of two successive skins, only the time elapses which is necessary for the processing of half a skin, or only the time necessary for the processing of that part of the skin which is effected by the first operating unit (FIG. 5). Thus the operator and the machine are fully employed.

What I claim is:

1. A machine for processing a flexible sheet on one face thereof, comprising:
   a first processing unit defining a first processing space having an open end permitting approximately one-half of the sheet to be inserted thereinto, said first unit having means disposed at one side of said space for processing the half of the face of the sheet in said first space upon withdrawal thereof from said first space;
   a second processing unit defining a second processing space having an open end permitting the other approximately one-half of the sheet to be inserted thereinto, said second unit having means disposed at one side of said second space for processing the other half of said one face of the sheet in said second space upon withdrawal thereof from said second space; and
   means for transferring the sheet from the first unit to the second unit arranged to provide free access to said first unit upon completion of the processing of said half of one face therein to permit placement in said first unit and similar processing of the first face half of a second sheet concurrently with the processing of said other face half of said first mentioned sheet in said second unit.

2. The processing machine of claim 1 further including means for removing the sheet upon withdrawal from said second unit and wherein said transferring means comprises means selectively operable to direct said sheet selectively into said second unit or therepast to the removing means.

3. The processing machine of claim 1 wherein each of said units includes sheet feeding means comprising unidirectionally rotating rollers.

4. The processing machine of claim 1 wherein said units are disposed back-to-back and said transferring means moves said sheet in a U-shaped path from the first unit to the second unit.

5. The processing machine of claim 1 including means for reversing the direction of facing of said sheet in moving into and moving from the second unit.

6. The processing machine of claim 5 wherein said spaces open upwardly and said face is down in moving between said units and up in moving from said second unit.

7. The processing machine of claim 1 wherein said transferring means includes means adjacent the entrance to said second space for guiding said other sheet half into said second space and upon reception thereof in said second space being selectively operable to urge the first sheet half from said transferring means to a removal means whereby said sheet is automatically removed from said processing units.

8. The processing machine of claim 1 wherein said transferring means is arranged to move said sheet in a substantially similar turned L-shaped path in moving from each of said units.

References Cited

UNITED STATES PATENTS

| | | | |
|---|---|---|---|
| 1,869,472 | 8/1932 | Freudenberg | 69—42 |
| 2,639,603 | 5/1953 | Whitney | 69—42 |
| 2,704,932 | 3/1955 | McIlvin et al. | 69—42X |
| 2,867,109 | 1/1959 | Phillips | 69—42 |
| 3,024,639 | 3/1962 | Lewis | 69—42 |
| 3,041,865 | 7/1962 | Gianoglio | 69—42 |
| 3,349,583 | 10/1967 | Schwaller | 69—43 |

FOREIGN PATENTS

| | | | |
|---|---|---|---|
| Ad. 80,654 | 4/1960 | France | 69—42 |

ALFRED R. GUEST, Primary Examiner